United States Patent [19]

Leingang

[11] 3,997,151
[45] Dec. 14, 1976

[54] MODULAR CUSHIONING PAD

[75] Inventor: Charles J. Leingang, Erie, Pa.

[73] Assignee: Lord Corporation, Erie, Pa.

[22] Filed: May 21, 1975

[21] Appl. No.: 579,334

[52] U.S. Cl. .............................. 267/152; 267/63 R; 267/140

[51] Int. Cl.² .......................................... F16F 3/10

[58] Field of Search ............... 267/63 R, 140, 141, 267/152, 153; 213/221; 105/197 A; 293/87, 88; 61/48; 114/219

[56] References Cited

UNITED STATES PATENTS

| | | | |
|---|---|---|---|
| 3,086,765 | 4/1963 | Zanow | 267/63 R |
| 3,489,402 | 1/1970 | Cobley | 267/152 |
| 3,684,271 | 8/1972 | Arthur | 267/63 R |
| 3,901,495 | 8/1975 | Suzuki | 267/153 |

Primary Examiner—James B. Marbert
Attorney, Agent, or Firm—Maurice R. Salada; James W. Wright; John A. Gazewood

[57] ABSTRACT

A modular cushioning pad comprises a rigid plate and at least one elastomeric cushion centered on the plate. One end surface of the cushion is bonded to the plate, while the second, opposite end surface is spaced from the plate. The outer side surface of the cushion has a first portion that slopes outwardly and away from the end of the cushion bonded to the plate. A second portion of the outer side surface slopes inwardly and away from the first portion of the surface to merge with the second end surface of the cushion. The plate and cushion are preferably annular.

8 Claims, 10 Drawing Figures

MODULAR CUSHIONING PAD

BACKGROUND OF THE INVENTION

Modular cushioning pads are often used in energy absorbing devices, such as suspension systems, draft gears and shock absorbers. In such devices, the pads are loaded in compression to absorb energy. Much attention has been directed to pads using bodies of elastomer in combination with rigid inserts and, specifically, to variations in the contours of the elastomeric bodies which will provide desirable performance characteristics. Such elastomeric cushioning pads often have central openings to facilitate stacking the pads and maintaining them in alignment by using a guide disposed through the communicating central openings. The rigid inserts enhance the load carrying ability of the cushioning pads in compression, improve the stability of the pads, and cooperate with the guide to maintain the pads in alignment. The contour of the elastomer may be varied to control more precisely the load-deflection characteristics of the pad and the bulging of the elastomer, and to enhance the fatigue life of the pad under repeated or cyclical loading.

Elastomeric cushioning pads generally have one of two general configurations. One configuration type includes an elastomeric cushion bonded between a pair of spaced rigid plates. The other type includes a single rigid plate having an elastomeric cushion bonded to one or both sides. The present invention relates to the latter type. Through proper design of the cross-sectional shape of the elastomeric cushion, a geometrical loading versus deflection characteristic can be obtained. This geometrical characteristic provides a near-linear spring rate versus load curve and results in a pad that has a near-constant natural frequency, irrespective of the load. Such performance characteristics are highly desirable in that excessive deflections can be prevented and good stability and control of motion is possible. Typical prior art pads utilizing a single rigid plate are disclosed in Willison U.S. Pat. No. 2,656,182 and Zanow U.S. Pat. No. 3,086,765.

The pad disclosed in Willison U.S. Pat. No. 2,656,182 includes a metal plate having a central opening and an elastomeric cushion bonded to one or both sides of the plate. The cushion is ring-like in shape and is disposed symmetrically relative to the plate opening. In vertical cross section, the elastomeric cushion is generally symmetrical in contour; that is, the inside and outside surfaces of the elastomeric cushion have the same contour but in opposite directions. In discussing the performance characteristics of such an elastomeric cushion, Willison specifically mentions that the contours of the inside and outside surfaces of the cushion cause the elastomer to fold or crease, during compression, along a line spaced a sufficient distance back from the peripheral edge of the cushion to protect the bond at the metal-elastomer interface. According to Willison, if the crease, during compression of the elastomer, should occur at or near the peripheral edges of the cushion, a high stress would be established at the bond interface which would result in rapid failure of the bond under repeated loadings. Applicant contends that the formation of this crease, while removing the high stress concentration from the bond interface, establishes a similar high stress area at the crease which also detrimentally affects the fatigue life of the pad under repeated loadings.

As discussed in Zanow U.S. Pat. No. 3,086,765, compression loading of a pad such as that disclosed in Willison establishes a resultant force radially outward of the pad which causes uneven flow and outward bulging of the elastomer, as compared to inward flow and bulging. Zanow employs the basic principles disclosed in Willison but adjusts the contour of the elastomer to be asymmetrical in vertical cross section so as to distribute more evenly the flow of elastomer inwardly and outwardly. The asymmetry is achieved by altering the slopes of the inside and outside surfaces of the elastomeric cushion. Creasing of the elastomer during compression loading is still employed to protect the interface bond. Zanow mentions that his asymmetrical contour results in a pad of greater capacity than previously available in symmetrical pads having a comparable volume of elastomer. It is believed that the alleged increase in capacity is a result of establishing higher stresses in the elastomer due to the opposing radial directions of bulging.

SUMMARY OF THE INVENTION

The present invention relates to a modular cushioning pad, incorporating a single rigid plate and an elastomeric cushion bonded to at least one side of the plate, in which stress concentration adjacent the plate-cushion interface is minimized through a unique contour of the cushion. According to the invention, one end surface of the cushion is bonded to the plate, while the second end surface is spaced from the plate. The outer side surface of the cushion has a first portion that slopes outwardly of the cushion and away from the end of the cushion bonded to the plate. A second portion of the outer side surface slopes inwardly and away from the first portion of the surface to merge with the second end surface. The plate and the cushion are preferably annular. The inside surface of the cushion, which defines the central opening in the cushion, slopes radially outwardly of the cushion to merge with the second end surface.

In one embodiment, the inside surface of the cushion, in cross section, defines a concave curve. The second portion of the outside surface is more steeply sloped relative to the rigid plate than the inside surface and may define an angle of 80° with the plate. The thickness of the first portion of the outside surface, measured in a plane perpendicular to the plate, is preferably significantly less than the thickness of the second portion. The rigid plate projects radially beyond the cushioning pad a substantial distance relative to the width of the pad so as to favor radially outward flow of the elastomer under compression loads.

In another embodiment of the pad, the outside pad surface also has a third portion that is disposed outwardly of the first and second portions. The third portion of the surface slopes inwardly of the cushion away from the end surface of the cushion bonded to the plate. A fourth portion of the outside surface extends inwardly from the third portion of the surface to the first portion.

BRIEF DESCRIPTION OF THE DRAWINGS

For a better understanding of the invention, reference may be made to the following description of exemplary embodiments, taken in conjunction with the accompanying drawings, in which.

DESCRIPTION OF EMBODIMENTS

Figure 1:
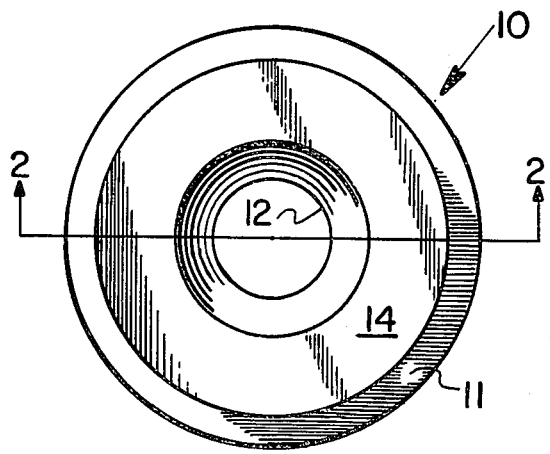
FIG. 1 is a top plan view of a modular cushioning pad according to the present invention.
Figure 2:
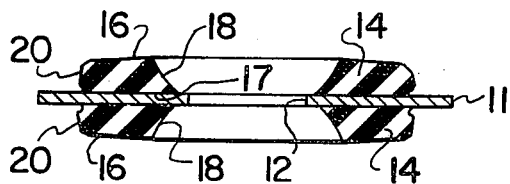
FIG. 2 is a sectional view taken along view line 2—2 of FIG. 1.

With reference to the various Figures of the drawings, in which like reference numerals indicate like parts, FIGS. 1 and 2 illustrate a modular cushioning pad, generally designated 10, according to the present invention. The modular pad 10 comprises a circular, planar plate 11 formed of metal or another rigid material and having a circular central opening 12. An elastomeric cushion 14 is bonded to each side of the rigid plate 11. The elastomeric cushions 14 may be formed of natural rubber or synthetic elastomeric materials and may be bonded to the plate utilizing conventional bonding techniques. Each of the elastomeric cushions 14 is identical and is ring-like in shape. They are disposed to encircle the plate opening 12 symmetrically and are arranged in opposing relation. The plate 11 preferably has a larger diameter than the elastomeric cushions 14 so that the plate has outer peripherial portions projecting radially beyond the cushions.

Each cushion 14 has an outer end surface 16 spaced from the plate 11 and from the end of 17 that is bonded to the plate. The end surface 16 slopes radially outward toward the plate 11 and thereby provides the elastomeric cushion 14 with a greater thickness at its inside edge as compared to its outside edge. One of the inherent characteristics of an elastomer is that under initial compression loadings, it will experience a permanent compression set. In the modular cushioning pad 10 of the present invention, due to the flow or bulge pattern of the elastomeric cushion 14, which is explained in detail hereinafter, a greater amount of permanent set is experienced at the inside edge 68 the cushion than at the outside edge. Fabricating the elastomeric cushion 14 to have a greater thickness at the inside edge than at the outside edge compensates for the variation in permanent set.

As shown in FIG. 2, the inside and outside surfaces 18 and 20, respectively, of each elastomeric cushion 14 are of substantially different contour. The inside surface 18 extends from adjacent the periphery of the plate opening 12 along a slope toward the outside of the cushion 14 to merge with the outer end surface 16. The surface 18 defines a concave curve in cross section, which favors outward bulging of the elastomeric cushion 14.

Figure 5:
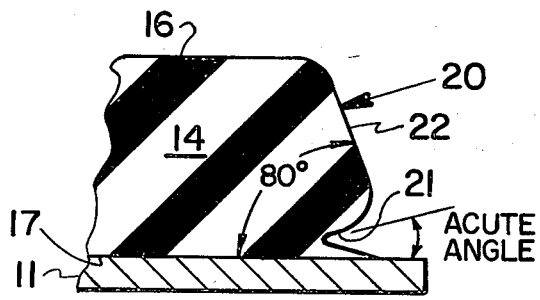
FIG. 5 is an enlarged sectional view of a portion of the modular cushioning pad shown in FIG. 2, illustrating the outside contour of the elastomeric cushion.

The outside surface 20, as best illustrated in FIG. 5, includes a first portion 21 adjacent the plate 11 which slopes radially outwardly of the cushion and away from the plate at an acute angle. The result is a circumferential groove in the elastomeric cushion 14 adjacent the plate 11. The outside surface 20 also includes a second portion 22 that joins the first portion 21 and slopes radially inwardly toward the inside surface 18 to merge with the outer end surface 16. The first and second portions 21 and 22 of the outside surface 20 together, in cross section, define a convex curve. The second portion 22 of the outside surface 20 is more steeply sloped than the inside surface 18. It has been found that convergence of the outside surface 20 relative to the inside surface 18 at an angle of about 80 degrees to the plane of the plate 11 results in a highly satisfactory modular cushioning pad 10. Such a slope of the outside surface 20 is compatible with the inside surface 18 to insure preferential radial flow outwardly. The thickness of the cushion 14 defined by and bordered by the first portion 21 of the outside surface 20 should preferably be significantly less than the thickness of the cushion 14 defined by and bordered by the second portion 22 of the surface.

The first portion 21 of the outside surface 20 is considered to provide stress relief for the bond at the interface between the plate 11 and elastomeric cushion 14. Initially, upon compression loading of the elastomeric cushion 14, the second portion of the outer surface 20 bulges outwardly and is pressed downwardly to engage the plate 11. The engagement will be prior to the build up of any significant stresses at the cushion-plate interface. As higher loads are applied, the bond at the interface is apparently protected by the elastomer that has come into engagement with the plate 11, thereby eliminating the area of high stress. In addition, as the elastomeric cushion 14 bulges, additional load-carrying area for the cushion 14 is created to enhance the capacity of the pad 10.

Figure 3:
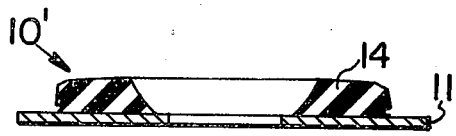
FIG. 3 is a sectional view of another modular cushioning pad according to the present invention.
Figure 4:
FIG. 4 is a sectional view similar to FIG. 3 showing the application of a compressive load to the modular cushioning pad of FIG. 3.

FIG. 3 of the drawings illustrates a modular cushioning pad 10' according to the present invention which includes a single elastomeric cushion 14 bonded to one side of the plate 11. FIG. 4 shows compression loading of the modular cushioning pad 10' of FIG. 3 illustrates the bulging characteristics of an elastomeric cushion 14 in compression as discussed above.

Figure 6:
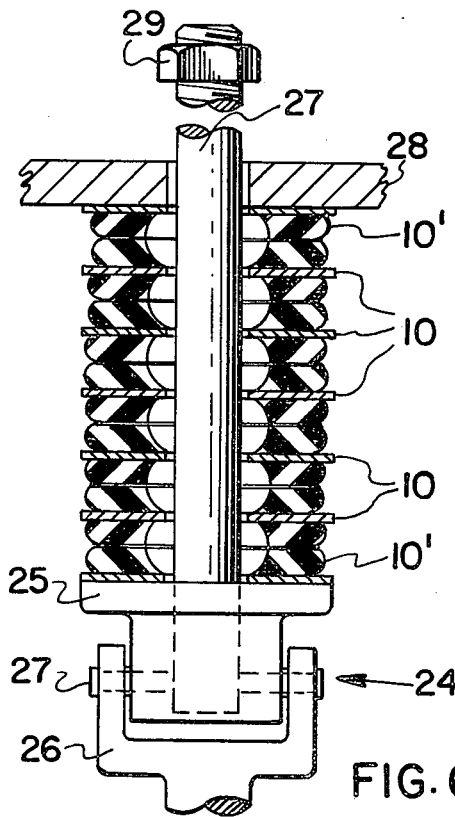
FIG. 6 is a suspension assembly utilizing a plurality of the modular cushioning pads of FIG. 2.

FIG. 6 illustrates an energy absorbing device utilizing a plurality of modular cushioning pads 10 and 10'. The device includes a lower supporting assembly 24 that comprises a supporting plate 25 pivotally connected to a support bracket 26 by a pin 27. The support bracket 26 may be carried by the axle (not shown) of a motor vehicle, for example. A guide rod 27 is mounted on the support plate 25 and extends upwardly through a supported plate 28, which may be carried, for example, by the frame (not shown) of a vehicle. A nut 29 is screwed onto the upper end of the guide rod 27 to limit the relative movement of the plates 25 and 28 axially in a direction away from each other. Between the plates 25 and 28, a plurality of modular cushioning pads 10 and 10' encircle the rod 27 in superimposed relation. The pads 10 and 10' are arranged with the outer end surfaces 16 of cushions 14 in engagement. The pads 10' at opposite ends of the stack have elastomeric cushions 14 only on the sides of the plates 11 remote from the plates 25 and 28, respectively. As can be seen, the use of pads 10' permits cushion-to-cushion contact of all of the pads 10 and 10' without any cushion 14 contacting a metal member other than the plate 11 to which the cushion is bonded.

Figure 7:
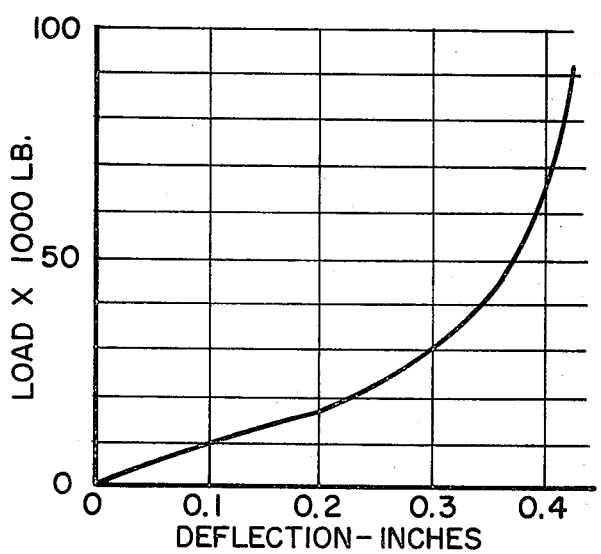
FIG. 7 is a typical load deflection diagram for the suspension assembly of FIG. 6.

The weight carried by plate 28 precompresses the pads 10 and 10' between the plates 25 and 28. Thus, the pads 10 and 10' will be alternately compressible and expandable upon relative axial movement between plates 25 and 28. The guide rod 27 maintains alignment of the pads 10 and 10'. The load-deflection characteristics of superimposed pads 10 and 10' are illustrated in FIG. 7.

Figure 8:
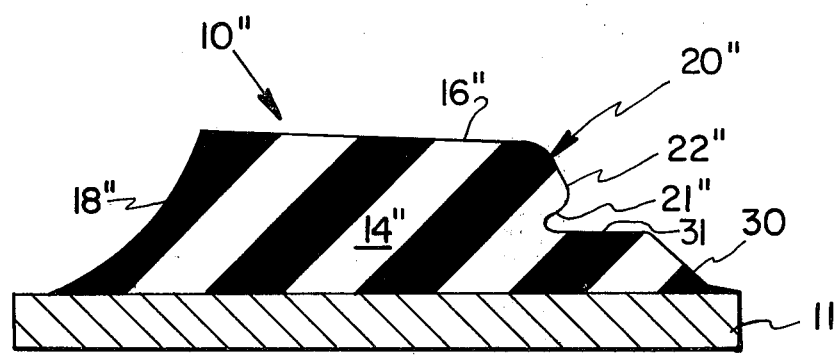
FIG. 8 is a view similar to FIG. 5, showing yet another cushioning pad according to the present invention.

In the modular pad 10" of FIG. 8, the outer surface 20" of the cushion 14" incorporates and supplements the configuration of the outer surfaces 20 of the cushions 14 of pads 10 and 10'. In addition to portions 21" and 22", which correspond to portions 21 and 22 of surfaces 20 of pads 10 and 10', the surface 20" of FIG. 8 includes two portions 30 and 31 disposed between the portions 21" and 22" and the plate 11. The portion 30 of the surface 20" is disposed radially outward of portions 21", 22" and 31 and slopes radially inwardly away from the plate 11 at an angle of about 45° to the plane of the plate. The portion 31 of the surface 20" extends radially inwardly from the portion 30 to the portion 21", making a slight angle (e.g. about 1°) with the plane of the plate 11. Portion 22" of the surface 20" defines an angle of about 60° with the plane of the plate.

Figure 9:
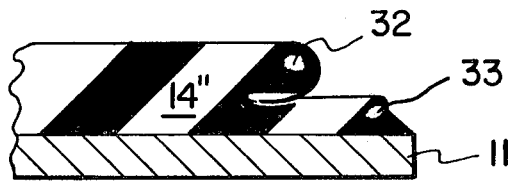
FIG. 9 is a view illustrating the typical bulging of the pad shown in FIG. 8 under a compression load.
Figure 10:
FIG. 10 is a view similar to FIG. 9 illustrating the application of a compression load approaching the maximum load the pad can support.

When the pad 10" is loaded in compression, as shown in FIGS. 9 and 10, the upper part 32 of the cushion 14" and the upper portions 21" and 22" of the surface 20" bulge radially outwardly over the lower part 33 of the cushion 14" and the portion 31 of the surface 20". It is believed that the smaller radial width and the greater axial height or thickness of the upper part 32 of the cushion 14" relative to the lower part 33 give the upper part of the cushion a softer radial shear spring rate, thereby permitting the lower part to act as a dam limiting radial elastomer flow. The bulging of the upper part 32 of the cushion 14" produces a crease at the intersection of portions 21" and 31 of the surface 20", which increases in radial width with increased bulging of the upper part of the cushion 14". Finally, with a large enough compression load, the radial forces on the lower part 33 of the cushion 14" cause substantial bulging of the lower part, as shown in FIG. 10. The upper and lower parts 32 and 33 of the cushion 14 thereafter bulge together, thereby limiting the stresses at the crease.

The pad 10" may have cushions 14" on each side of the plate 11, as in the pad 10 of FIg. 2. Similarly, several pads 10" may be incorporated in a device such as shown in FIG. 6. The performance of a plurality of pads 10" can duplicate the performance shown in FIG. 7, if the elastomer used in the pads 10" has a smaller modulus of elasticity (i.e. Young's Modulus) than the elastomer used in pads 10 and 10' of similar dimensions.

While it may not be immediately apparent from the drawings, the elastomer in the pad 10" is distributed substantially equally between the radially inner and outer halves of the width of the plate 11. In other words, if the radial width of the plate 11, as shown in FIG. 8, for example, is divided in half, approximately one-half of the cross-sectional area of the cushion 14 will be disposed on each side of the center line of the plate.

It will be understood that the embodiments described above are merely exemplary and that persons skilled in the art may make many variations and modifications without departing from the spirit and scope of the invention. For example, the cushioning pad of the invention may have a rectangular or square shape and need not include central openings in its component plate and cushion. Without such central openings, the pad can still be held in a stack with similar pads by using a hollow canister. All such modifications are intended to be within the scope of the invention as defined in the appended claims.

What is claimed is:

1. A modular cushioning pad comprising a rigid plate and at least one elastomeric cushion centered on said plate, the cushion having a first end surface bonded to a side of the plate, a second end surface opposite and spaced from the first end surface, and an outside surface defining the outer side periphery of the cushion, the outside surface of the cushion having (a) a first portion sloping inwardly of the cushion and away from the first end surface and extending part way to the second end surface, (b) a second portion spaced inwardly of the first portion and sloping radially inwardly of the cushion and away from said first end portion toward said second end surface and (c) a third portion extending inwardly of the cushion from the first portion to the second portion, the first portion of the outside surface being disposed outwardly of the second and third portions.

2. A modular cushioning pad, according to claim 1, wherein the plate and the cushion are annular and wherein the cushion also has an inside surface which defines the central opening in the cushion and which slopes radially outwardly of the cushion away from the first end surface to merge with the second end surface.

3. A modular cushioning pad, according to claim 2, wherein the second end surface from its radially inner periphery to its radially outer periphery slopes toward said plate.

4. A modular cushion pad, according to claim 2, wherein the inside surface of the cushion in cross section defines a concave curve.

5. A modular cushioning pad, according to claim 1, wherein the second portion of the outside surface merges with the second end surface of the elastomeric cushion.

6. A modular cushioning pad comprising a rigid plate and at least one elastomeric cushion centered on the plate, the cushion having a first end surface bonded to a side of the plate, a second end surface opposite and spaced from the first end surface, and an outside surface defining the outer periphery of the cushion, the outside surface of the cushion having:
   a. a first portion that slopes outwardly of the cushion and away from the first end surface;
   b. a second portion that is contiguous with the first portion and slopes inwardly of the cushion and away from the first portion of the outside surface toward the second end surface, the thickness of the first portion of the outside surface measured in a plane perpendicular to the rigid plate being less than the thickness of the second portion of said surface;
   c. a third portion sloping inwardly of the cushion and away from the first end surface of the cushion; and
   d. a fourth portion extending inwardly of the cushion from the third portion to the first portion, the third portion of the outside surface being disposed outwardly of the first, second and fourth portions of said surface and the first portion of the outside surface being disposed between the second and fourth portions of said surface.

7. A modular cushioning pad, according to claim 6, wherein the second portion of the outside surface continuously slopes inwardly of the cushion and merges with the second end surface of the cushion.

8. A modular cushioning pad, according to claim 6, wherein the plate and the cushion are annular and wherein the cushion also has an inside surface which defines the central opening in the cushion and which slopes radially outwardly of the cushion away from the first end surface to merge with the second end surface.

* * * * *

UNITED STATES PATENT OFFICE
CERTIFICATE OF CORRECTION

PATENT NO. : 3,997,151
DATED : December 14, 1976
INVENTOR(S) : Charles J. Leingang It is certified that error appears in the above-identified patent and that said Letters Patent are hereby corrected as shown below:

Column 3, line 43, "of" should be -- surface -- .

Column 3, line 54, "68" should be -- of -- .

Column 6, line 20, "portion" should be -- surface -- .

Signed and Sealed this

Twenty-ninth Day of January 1980

[SEAL]

Attest:

SIDNEY A. DIAMOND

Attesting Officer  Commissioner of Patents and Trademarks